Figures 1, 2:
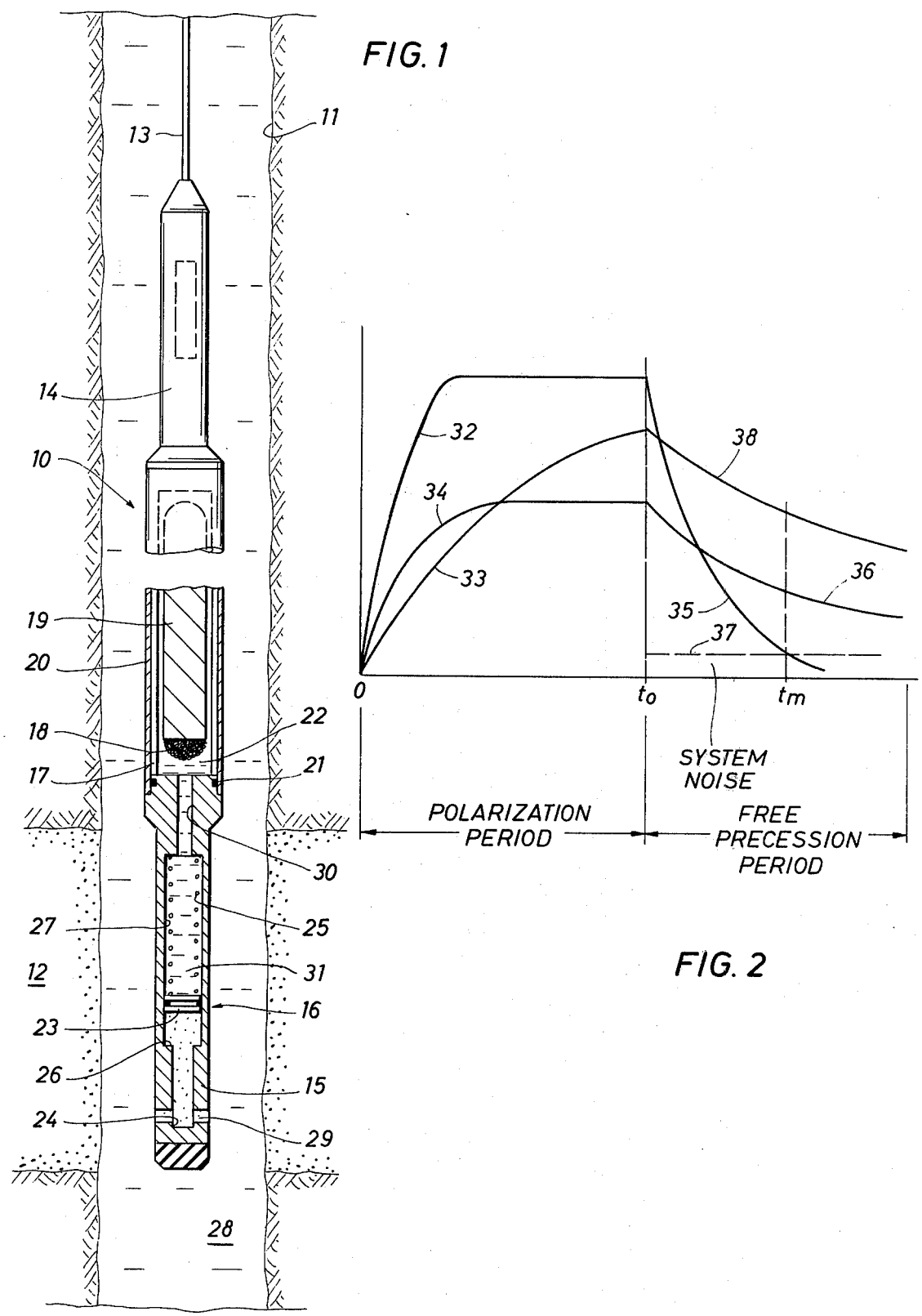

United States Patent [19]

Chandler

[11] 4,035,718
[45] July 12, 1977

[54] ENCLOSED NUCLEAR-MAGNETISM LOGGING TOOL WITH COMPENSATED COIL-ISOLATING SYSTEM

[75] Inventor: Richard N. Chandler, Houston, Tex.

[73] Assignee: Schlumberger Technology Corporation, New York, N.Y.

[21] Appl. No.: 716,725

[22] Filed: Aug. 23, 1976

[51] Int. Cl.² ..................................... G01N 27/00
[52] U.S. Cl. ............................... 324/.5 G; 324/.5 R
[58] Field of Search ................ 324/.5 R, .5 G, .5 H, 324/8; 252/62.52

[56] References Cited

U.S. PATENT DOCUMENTS

| | | | |
|---|---|---|---|
| 3,042,855 | 7/1962 | Brown | 324/.5 R |
| 3,538,429 | 11/1970 | Baker, Jr. | 324/.5 G |

*Primary Examiner*—Rudolph V. Rolinec
*Assistant Examiner*—Michael J. Tokar
*Attorney, Agent, or Firm*—Ernest R. Archambeau, Jr.; William R. Sherman; Stewart F. Moore

[57] ABSTRACT

In the representative embodiment of the present invention disclosed herein, a nuclear-magnetism logging tool is arranged with at least its polarizing and detecting coil isolated in an enclosed chamber containing a uniquely-treated hydrogenous oil and preferably coupled to a suitable compensating system operatively arranged for responding to borehole pressure and temperature conditions. In particular, a selected, minor amount of a ferromagnetic colloid is dispersed in the oil in a sufficient concentration for uniquely effecting a controlled decay of nuclear magnetic noise signals from the coil-isolating oil, with this decay being of selected rapidity sufficient to avoid interference with the measurement of nuclear magnetic measurement signals from earth formations.

10 Claims, 2 Drawing Figures

ENCLOSED NUCLEAR-MAGNETISM LOGGING TOOL WITH COMPENSATED COIL-ISOLATING SYSTEM

As described in U.S. Pat. No. 3,538,429, for example, one type of downhole logging tool which has been considered heretofore is cooperatively arranged for detecting magnetically-polarizable hydrogenous fluids contained in earth formations adjacent to the tool. Ordinarily, these so-called "nuclear-magnetism logging" of "NML" tools include either one or two polarizing coils of considerable physical size and associated circuitry. Although separate detecting coils may be use, it is more common for switching circuits to be provided so that the polarizing coil itself can be used for that purpose. In use, a typical NML tool is operated so as to periodically apply strong transient magnetic fields to the surrounding formations. Then, upon the successive collapse of these fields, one or more measurements are obtained which are representative of the subsequent free precession of any polarized hydrogen nuclei or protons contained in the nearby formation fluids. These measurements are typically indicative of the rate at which the detected signal rapidly decays once the polarizing field is removed.

Those skilled in the art recognize, of course, that the polarizing and detecting coils must be substantially isolated from materials comprised of magnetizable constituents or having a macroscopic magnetic or paramagnetic nature. Moreover, as a further limitation, the coil should also be separated as far as possible from substances having gyromagnetic characteristics affecting the use of the coil for detecting the desired formation signals. These restrictions have, therefore, served heretofore to preclude the enclosure of these polarizing and detecting coils within a tool housing containing a suitable hydrocarbon oil as is customarily done with most, if not all, other types of oilfield logging tools for maintaining the interior of the tool housing at an elevated pressure commensurate with the borehole pressure. As a usual matter, such oils are otherwise well suited to adverse borehole conditions; but it is well known that their hydrogen content will effectively render a NML tool totally inoperative. Synthetics such as fluorocarbon-based oils and other non-hydrogenous liquids are ordinarily unsuited for one reason or another.

To avoid this problem, one common arrangement for NML tools heretofore has been to enclose only the associated electronic circuitry in a suitable pressure-tight housing and simply leave the polarizing and detecting coil or coils exposed to the environment outside of the tool housing. It is recognized, however, that although borehole fluids exterior of the polarizing and detecting coil ordinarily present little or no problem, the presence of such fluids within the bounds of the coil itself is unduly detrimental. Thus, in other arrangements, the polarizing and detecting coil has often been encapsulated in a solid body of epoxy-fiberglass or some similar non-magnetic plastic material. Encapsulation of the coil is, however, generally unsatisfactory at elevated borehole temperatures since only limited amounts of power can be safely dissipated without severely deteriorating the encapsulating plastic. Alternatively, other prior-art tools have sought to enclose the coil within an otherwise-empty housing of either a non-magnetic stainless steel or some non-ferrous metal such as aluminum. This arrangement is also very limited in practical application since extremely-thick housings will be required for withstanding even moderate borehole pressures.

As described in U.S. Pat. No. 3,5042,855, for instance, still another approach which has been proposed is to enclose the polarizing and detecting coil within a hollow plastic body or an expandable bag and fill the spaces around the coil with a flowable, non-magnetic material that is maintained under pressure. To avoid interference to detection of the formation signals, the materials used for the body or bag as well as the flowable non-magnetic material are specifically chosen so as to require extremely longer polarization periods than those ordinarily experienced with borehole or connate fluids. In that patent, materials (such as benzene or benzene diluted with carbon disulfide) having exceptionally-long relaxation periods or non-hydrogenous materials (sush as carbon tetrachloride) giving no spin magnetic induction signal are the only substances which are disclosed as being suited as a flowable material for isolating the coil.

Those skilled in the art will, of course, recognize that when intermixed materials or contiguous substances of different relaxation characteristics are subjected to a common polarizing field, there will inherently be corresponding precession signals emanating from each of the substances respectively contributing to the overall signal detected by the tool. Thus, even though the contribution to the overall signal from the aforementioned coil-isolating materials alone may well be minor, that contribution nevertheless represents an undesirable noise signal. Moreover, it will also be appreciated that neither of the aforedescribed coil-isolating fluids has thermal or hydraulic properties which, even under ordinary borehole conditions, are suited for use as an effective pressure-compensating fluid in the tool housing. The performance of such fluids under elevated borehole pressures and temperatures will, of course, be unacceptable for commercial logging operations.

Accordingly, it is an object of the present invention to provide a new and improved enclosed nuclear-magnetism logging tool having a coil-isolating system which is well suited and properly compensated for operation under adverse borehole pressures and temperatures but without unduly affecting the operation of the tool.

This and other objects of the present invention are attained by cooperatively arranging a new and improved nuclear-magnetism logging tool with its polarizing and detecting coil or coils enclosed within a non-magnetic housing defining a chamber. This chamber contains a unique hydrogenous liquid having a collodial suspension of ferromagnetic particles dispersed therein at a selected concentration level which, on the one hand, is not so great as to exhibit macroscopic magnetic properties sufficient to significantly perturb nuclear-magnetism signals from adjacent connate fluids and which, on the other hand, is sufficiently high that the decay of the free precession signals in the isolating liquid will be at an accelerated rate adequate to attenuate those unwanted signals to a selected amplitude which, preferably, is below the electrical system noise level of the tool but which, in no event, is never greater than the amplitude of nuclear-magnetism signals from the connate fluids as those sought-after signals are being measured.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 shows a preferred embodiment of a new and improved nuclear-magnetism tool of the present invention; and FIG. 2 graphically presents a comparison of the operating characteristics of a nuclear-magnetism logging tool incorporating the principles of the present invention with the characteristics of prior-art tools.

Turning now to FIG. 1, a new and improved nuclear-magnetism logging tool 10 is depicted as it will appear as it is being moved through a borehole 11 penetrating one or more earth formations, as at 12, containing connate fluids. As is customary, the logging tool 10 is suspended from a typical armored electrical cable 13 which is spooled on a powered winch (not shown) positioned at the surface and arranged as required for raising and lowering the tool in the borehole 11.

In the preferred embodiment of the logging tool 10 depicted in FIG. 1, the tool is provided with upper and lower housing sections or enclosed metal bodies, as at 14 and 15, with the upper tool body carrying the downhole portions of the electrical system or circuitry (not shown) for the tool and the lower tool body being arranged to incorporate a new and improved pressure-compensating system 16 employing the principles of the present invention. The logging tool 10 is also uniquely constructed with means such as a pair of laterally-spaced metal bars or elongated support members, as at 17, of minimum cross section intercoupling the upper and lower bodies 14 and 15.

As is typical with nuclear-magnetism tools, the new and improved tool 10 is provided with polarizing and detecting means including at least one multi-turn coil 18 coupled to the electronic circuitry of the tool and cooperatively arranged for periodically applying a strong magnetic field to adjacent earth formations as at 12. To support the coil 18, it is wound on a core 19 of a suitable non-magnetic material such as ceramic that is secured between the spaced support bars as at 17. The polarizing and detecting coil 18 is preferably formed in a generally-rectangular configuration, with the longer sides of the coil turns being parallel to the longitudinal axis of the tool 10 so as to apply the maximum-possible polarizing field to the earth formations as at 12. Thus, the core 19 is preferably an elongated member with rounded ends and having its major axis generally coextensive with the longitudinal axis of the new and improved tool 10.

In keeping with the objects of the present invention, in its preferred embodiment the intermediate portion of the tool 10 is further provided with an elongated thin-wall tube 20 of a non-magnetic material, such as an epoxy-fiberglass, suitable for use in typical boreholes as at 11. As illustrated, the non-magnetic enclosure 20 is coaxially disposed around the polarizing coil and the support bars, as at 17, and has its upper and lower ends respectively sealed, as at 21, in relation to the upper and lower tool bodies 14 and 15 for defining an enclosed, fluid-tight space or cavity 22 completely surrounding the coil 18.

The new and improved pressure-compensating system 16 is preferably arranged in the lower body 15 so as to allow the electrical elements of the NML tool 10 to be disposed in its upper portions. As is customary with other types of logging tools the pressure-compensating system 16 preferably includes a piston member 23 movably disposed within an elongated or longitudinal bore 24 in the lower body 15 and normally biased downwardly by a spring 25 toward a shoulder 26 located as required to establish the maximum or full-expansion volume of an enclosed fluid chamber 27 defined in that portion of the bore above the piston. To make the piston 23 responsive to the pressure of borehole fluids, as at 28, the lower portion of the longitudinal bore 24 is communicated with the exterior of the tool 10 by means such as one or more lateral ports 29 arranged in the lower end of the tool body 15. The upper portion of the fluid chamber 27 is coupled, as by an interconnecting passage 30, to the cavity 22. This typical arrangement will, of course, also provide suitable accommodation for volumetric changes within the chamber 27 which will come about by pressure and temperature changes in the borehole 11.

In keeping with the objects of the present invention, the enclosed cavity 22, the interconnecting passage 30 and the fluid chamber 27 above the piston 23 are filled with a unique hydraulic fluid or hydrocarbon-based oil, as at 31, having suitable dielectric properties as well as special characteristics or physical properties specifically adapted to avoid perturbation of nuclear-magnetism signals from adjacent earth formations such as 12. It will, of course, be recalled from the preceding discussion that any hydrocarbon-based hydraulic fluid (such as Univis J-58 as presently manufactured by the Exxon Corporation of Houston, Tex., as their Formula No. 3131 and which is customarily used throughout the industry as a convenient pressure-balancing or dielectric fluid in other types of logging tools) would ordinarily be considered to be totally unacceptable for isolating the polarizing or detecting coils in nuclear-magnetism logging tools. However, it has been found that such hydrogenous liquids can be effectively conditioned for use in the new and improved logging tool 10 by uniquely treating the oil 31 with minor amounts of an additive having significant macroscopic magnetic properties.

Specifically, it has been found that by adding measured, minor quantities of collodial magnetic particles (which, by means of appropriate surfactants and the like, are maintained in a homogenous suspension within a compatible oil-based carrier) to the pressure-compensating oil 31, the entirety of the hydrogenous liquid or oil mixture will be effectively treated or uniquely modified to such an extent that there will be few, if any, spurious or unwanted nuclear-magnetism signals from that oil mixture that will interfere with the reception of nuclear-magnetism signals from connate fluids in nearby earth formations. Accordingly, it will be recognized by those skilled in the art that upon application of current to the polarizing coil 18, there will be a characteristic increase in the net nuclear magnetization of any hydrogenous pressure-compensating fluid, such as the oil 31, which may be used for surrounding the coil. As graphically represented at 32 in FIG. 2, the rate of this rise when plotted versus time will, of course, depend upon the specific gyromagnetic properties of the particular pressure-compensating fluid.

By way of example, the curve 33 schematically represents a typical net nuclear magnetization response that might be anticipated for such undesirable fluids as described in the aforediscussed U.S. Pat. No.

3,042,855; and, similarly, the curve 34 is exemplary of the response with either typical connate fluids or untreated hydrogenous pressure-compensating oils having a prolonged longitudinal relaxation time equal to that of such typical connate fluids. On the other hand, as graphically depicted at 32, with a hydrogen-based pressure-compensating oil as at 31 that has been uniquely treated in accordance with the principles of the present invention, it has been found that the unique oil will inherently exhibit a characteristic rise which, as depicted, is much quicker than the magnetization rises for the other two fluids. It will, of course, be recognized that a particular fluid being polarized will achieve maximum nuclear magnetization at some finite time which is directly related to its specific gyromagnetic properties, its distance from the polarizing coil 18, and the strength of the polarizing field. However, as will subsequently be explained, it should be noted that the particularly rapid rise time of the unique pressure-compensating oil 31 is not of material importance to the success of the present invention.

Instead, as best depicted by the graphical representations in FIG. 2 of various signals which could typically be detected by the new and improved tool 10, it will be seen by the curve 35 that the significance of the present invention is primarily to assure that the nuclear-magnetism signal produced by the unique pressure-compensating oil 31 will have rapidly decayed to an insignificant level before measurements are made of the decaying signal, such as at 36, then being produced by any nearby connate fluids. Thus, as a matter of good operating practice, it is preferred to be certain that the nuclear-magnetism signal or noise from the pressure-compensating oil 31 will have decayed to a level that is no greater than the inherent system noise level (as at 37) which is typically experienced with tools as at 10. Conversely, it will be noted at 36 in FIG. 2 that a typical decay for nuclear-magnetism signals from normal connate fluids (or ordinary untreated, pressure-compensating fluids as well) will be such that those signals will generally be well above the level of the system noise 37 for a considerable length of time after measurements are begun. By way of comparison, it will be noted at 38 that a typical hydrogenous fluid such as described in U.S. Pat. No. 3,042,855 will exhibit a detectable, spurious or interfering signal long after signal measurements are begun.

It will be recognized, therefore, that the unique pressure-compensating fluid 31 used in a given NML tool, as at 10, must be specially treated as required to achieve desired responses under stated well bore conditions and with specific operating characteristics of the tool. For example, those skilled in the art should appreciate that the specific level of system noise, as at 37, will be wholly dependent upon such things as the design and quality of the electronic circuitry in the tool 10 as well as the particular arrangement and design of its polarizing and detecting coil 18. Furthermore, in designing a given NML tool as at 10, the particular relationships between the initial signal amplitudes and the decay rates of the unique coil-isolating fluid 31 as well as of the connate fluids ordinarily encountered in operation will involve many factors which must be specifically determined by the use of the usual equations and empirical data such as explained, for example, in Abragam, "The Principles of Nuclear Magnetism" (Clarendon Press 1961).

Accordingly, although no specific or absolute limits can be set, certain criteria of at least a general nature can be established for one with ordinary skill in the art to fully understand the present invention. First of all, the quantity or concentration level of colloidal magnetic particles suspended in the unique coil-isolating oil 31 cannot exceed a level that will significantly interfere with the measurements by the coil 18 of the precession signals from the adjacent or surrounding earth formations. From mathematical analysis, it is believed that mixtures of an oil-based ferromagnetic fluid or Ferrofluid (as presently manufactured in a concentrated form under the catalog number of 4H03 by Ferrofluidics Corporation of Burlington, Mass.) at concentrations of about 10% by volume in a Univis J-58 oil will give rise to objectionable or excessive signal interference. A mixture at that maximum concentration level will have a density of about 0.90-gr/ml at room conditions which is equal to the iron particles being about 4% by weight of the entire mixture.

As one example of an exemplary concentration level, it was found that outstanding operating results are obtained with the new and improved logging tool 10 with concentrations in the order of only 1% by volume of the above described Ferrofluid in a Univis J-58 oil. The density of the above-mentioned 4H03 Ferrofluid is 1.25-g/ml at 77° F, and its magnetic saturation is 400-gauss. Thus, the approximate density of the 1% solution at room temperature will be in the order of 0.87gr/ml. Stated another way, it will be seen that a mixture of 1-part of the 4H03 Ferrofluid in 99-parts of Univis J-58 oil will have about 0.38-g of ferromagnetic particles dispersed in about 87-g of the oil or about 0.4% by weight of such particles.

Secondly, it must be recognized that the quantity or concentration level of the ferromagnetic fluid such as the above-mentioned Ferrofluid must be sufficiently high to be certain that the unwanted free precession signal developed in the unique pressure-compensating oil 31 will decay with sufficient quickness to have brought that unwanted signal to an acceptable level which is at least no greater than, if not somewhat below, the expected level of the sought-after formation signals by the time such measurements are obtained. This differential is, therefore, best achieved by having the concentration level of the 4H03 ferromagnetic fluid in the unique pressure-compensating oil 31 to be no less than about 0.1% by volume when the receiving cycle is, for example, designed to be initiated 10-milliseconds following the end of the polarizing cycle. This lower limit is a mixture in the order of about 0.04% by weight of such particles in the oil 31.

Accordingly, it will be appreciated that the new and improved nuclear-magnetism logging tool of the present invention in uniquely arranged in such a manner as to be fully protected from adverse borehole conditions but still capable of effectively receiving nuclear-magnetism signals. By surrounding the tool with a hydrogenous oil which is readily maintained at borehole conditions, the several components of the tool are adequately protected. On the other hand, interference with the efficient detection of spurious nuclear-magnetism signals from connate fluids which the protective oil would otherwise cause is uniquely avoided by treating the oil with minor amounts of suspended ferromagnetic colloidal substances.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A nuclear-magnetism logging tool adapted to be lowered into a borehole penetrating earth formations and comprising:

means including electrical coil means operable for momentarily applying an electromagnetic field to such earth formations for temporarily polarizing the nuclei of hydrogenous connate fluids therein and, at a selected time thereafter, detecting at least one measurement signal induced in said coil means in response to the free precession of such nuclei following removal of said polarizing field; and means isolating said electrical coil means and including non-magnetic body means defining a fluid-tight space enclosing said electrical coil means and containing a hydrogenous oil having a homogenous suspension of colloidial ferromagnetic particles dispersed therein at a selected concentration sufficient for effecting a controlled decay of noise signals induced in said coil means in response to the free precession of hydrogenous nuclei in said hydrogenous oil following removal of said polarizing field, said controlled decay at a rate sufficient to attenuate said noise signals by said selected time to an amplitude no greater than that of said measurement signal.

2. The logging tool of claim 1 wherein said selected concentration of ferromagnetic particles is at least as great as about 0.04% by weight of said hydrogenous oil.

3. The logging tool of claim 1 wherein said selected concentration of ferromagnetic particles is about 0.4% by weight of said hydrogenous oil.

4. The logging tool of claim 1 wherein said selected concentration of ferromagnetic particles is no greater than about 4% by weight of said hydrogenous oil.

5. A nuclear-magnetism logging tool adapted to be lowered into a borehole penetrating earth formations and comprising:

a tool body having at least one portion formed of a non-magnetic material and defining a fluid-tight enclosure;

means on said tool body including electrical coil means within said fluid-tight enclosure and operable for momentarily applying an electromagnetic field to such earth formations for temporarily polarizing the nuclei of hydrogenous connate fluids therein and, at a selected time thereafter, detecting at least one measurement signal induced in said coil means in response to the free precession of such nuclei following removal of said polarizing field; and pressure-compensating means on said tool body adapted for maintaining said fluid-tight enclosure at elevated pressures commensurate with borehole pressures exterior thereof and including a hydrogenous oil within said fluid-tight enclosure and having a homogenous suspension of colloidial ferromagnetic particles dispersed therein at a selected concentration sufficient for effecting a controlled decay of noise signals induced in said coil means in response to the free precession of hydrogenous nuclei in said hydrogenous oil following removal of said polarizing field, said controlled decay being at a rate sufficient to attenuate said noise signals by said selected time to an amplitude no greater than that of said measurement signal.

6. The logging tool of claim 1 wherein said selected concentration of ferromagnetic particles is at least as great as about 0.04% by weight of said hydrogenous oil.

7. The logging tool of claim 1 wherein said selected concentration of ferromagnetic particles is about 0.4% by weight of said hydrogenous oil.

8. The logging tool of claim 1 wherein said selected concentration of ferromagnetic particles is no greater than about 4% by weight of said hydrogenous oil.

9. A nuclear-magnetism logging tool adapted to be lowered into a borehole penetrating earth formations and comprising:

a tool body having spatially-disposed hollow body sections collectively defining a fluid-tight enclosure, with at least one of said body sections being formed of a non-magnetic material;

circuit means within said enclosure including electrical coil means arranged within said non-magnetic body section and operable for momentarily applying an electromagnetic field to such earth formations for temporarily polarizing the nuclei of hydrogenous connate fluids therein and, at a selected time thereafter, detecting at least one measurement signal induced in said coil means in response to the free precession of such nuclei following removal of said polarizing field;

pressure-compensating means including a hydrogenous oil is said fluid-tight enclosure around said coil means having a suspension of colloidial ferromagnetic particles dispersed therein at a concentration which is no greater than about 4% by weight of said hydrogenous oil so as to not significantly shield said pollarizing field and which is greater than about 0.04% by weight of said hydrogenous oil so as to selectively decay noise signals induced in said coil means by the free prescession of hydrogenous nuclei in said hydrogenous oil following removal of said polarizing field to an amplitude by said selected time that is no greater than the amplitude of said measurement signal, and a pressure-responsive member movably arranged on one of said tool body sections and operatively communicated with said fluid-tight enclosure for maintaining the pressure of said hydrogenous oil at a pressure proportionally related to the pressure of borehole fluids exterior of said tool body sections.

10. The logging tool of claim 9 wherein said concentration of said ferromagnetic particles is about 0.4% by weight of said hydrogenous oil.

* * * * *